United States Patent [19]

F'Geppert

[11] 4,040,686
[45] Aug. 9, 1977

[54] ANTI-FRICTION BEARING

[75] Inventor: Erwin F'Geppert, Novi, Mich.

[73] Assignee: The U.S. Government as represented by the Secretary of the Army, Washington, D.C.

[21] Appl. No.: 625,334

[22] Filed: Oct. 23, 1975

[51] Int. Cl.² ............................................. F16C 19/20
[52] U.S. Cl. .................................... 308/201; 308/199
[58] Field of Search ................ 308/199, 201, 217, 218

[56] References Cited

U.S. PATENT DOCUMENTS

| | | | |
|---|---|---|---|
| 2,675,282 | 4/1954 | Mason | 308/199 |
| 2,697,644 | 12/1954 | Zeilman | 308/199 |
| 3,506,317 | 4/1970 | Angeli | 308/236 |
| 3,918,778 | 11/1975 | Jacobson et al. | 308/201 |

Primary Examiner—Richard A. Bertsch
Attorney, Agent, or Firm—Peter A. Taucher; John E. McRae; Nathan Edelberg

[57] ABSTRACT

An anti-friction bearing wherein the anti-friction balls or rollers are spaced different distances from one another to provide an increased number of loading patterns and a reduced frequency of any particular loading pattern.

1 Claim, 3 Drawing Figures

ANTI-FRICTION BEARING

Conventional anti-friction bearings include separator devices designed to space all anti-friction elements the same distance apart. For example, a ball bearing assembly having 12 anti-friction balls would include a separator formed with ball openings spaced 30° apart. The regularly spaced balls would deliver a repetitive peak loading to the load-absorption race at very frequent intervals, e.g. every 30°. It is believed that such frequent repetitive loadings have a probability for initiating shock or wear failure sooner than would be the case if the repetitive peak loading conditions were less frequent.

The present invention seeks to lessen the frequency of any given high load condition, thereby increasing the probabilities for a longer service life. The lessened high load frequency is obtained by varying the spacing between different ones of the anti-friction elements.

THE DRAWINGS

Figure 1:
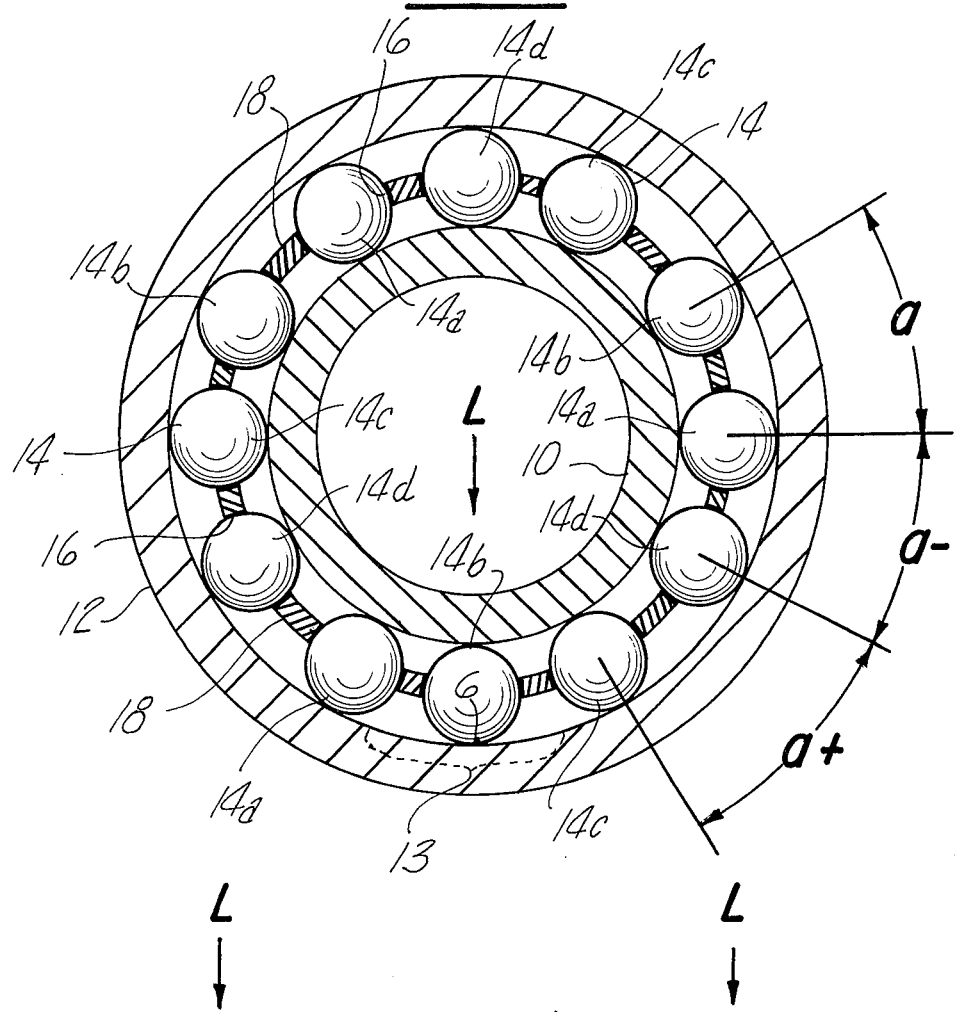
FIG. 1 is a sectional view taken through a bearing assembly incorporating the invention.

As seen in FIG. 1, the novel bearing assembly comprises an inner race 10, an outer race 12, and a series of anti-friction ball elements 14 interposed therebetween. The anti-friction elements are freely seated or disposed in openings 16 in an annular separator ring 18 that floats between the two races. The assembly is conventional except that openings 16 are non-evenly spaced.

Depending on installation conditions, either race may be carried by the rotary power element; the other race may be mounted in a stationary support structure. For discussion purposes we will assume that inner race 10 is affixed to a rotary shaft (not shown). We will also assume that the rotary shaft applies a constant or periodic peak load to the inner race in the direction designated by letter L. The load is transmitted through race 10 and selected ones of ball elements 14 to the outer race 12. Race 12 is required to have sufficient hardness and wearability to absorb the load forces, particularly at the load contact area designated by numeral 13. Since in practice the exact location of peak load area 13 is unknown the entire surface of race 12 must possess load-absorption capability.

Figure 2:
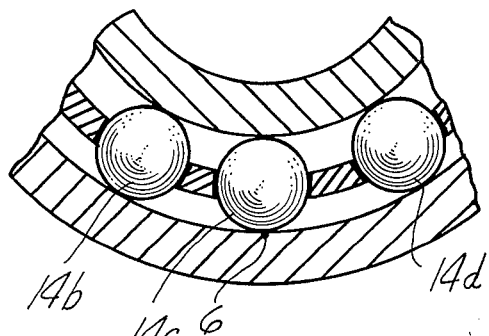
FIGS. 2 and 3 are fragmentary views of the FIG. 1 assembly taken at different points in the rotational cycle.
Figure 3:
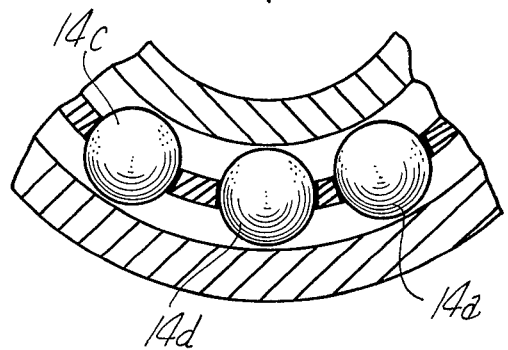

FIG. 1 shows the assembly at a certain period in its rotary cylce. FIG. 2 shows the assembly displaced approximately 30° clockwise from the FIG. 1 condition. FIG. 3 shows the assembly displaced approximately 30° clockwise from the FIG. 2 position.

In the FIG. 1 position the load L is borne principally by the three balls 14a, 14b and 14c located at the seven o'clock, six o'clock and five o'clock positions; the other nine balls in the system are essentially unloaded. In the FIG. 2 position the load L is borne principally by a different combinational sequence of balls, shown at 14b, 14c and 14d. In the FIG. 3 position the load L is borne principally by a third combinational sequence of balls, shown at 14c, 14d and 14a.

If the various balls 14a, 14b, 14c and 14d were evenly spaced the peak loading at the six o'clock point on race 12 would or could repeat regularly as each ball passed over that point. However it is believed that the peak load repetition rate or frequency will be decreased if the balls are non-evenly spaced, as shown for example in FIG. 1.

In FIG. 1 the 12 balls are arbitrarily divided into four sets of balls 14a, 14b, 14c and 14d. The ball center spacing between balls 14a and 14b is denoted by dimension $a$. The center spacing between balls 14a and 14d is slightly less than dimension $a$. The center spacing between balls 14d and 14c is slightly greater than dimension $a$. The relative dimensions are denoted by plus and minus signs in the drawing. The total number of balls in the FIG. 1 assembly is 12. Although there is one single ball diameter there are three different ball spacings; the ball spacing is therefore repeated at every fourth ball. The number of ball spacings $a$, $a-$, $a+$, etc. can be varied, although the number of different ball spacings is preferably an even fraction of the total ball complement for reasons of balance. For example, if the total ball complement is 24, then the number of different ball spacings can be two, three, four, six or eight. The variation in ball spacing within any given bearing assembly need not be very great.

In the arrangement shown in FIG. 1 of the drawing three loaded balls 14a, 14b and 14c are non-symmetrically oriented relative to the nominal load absorption contact point 6. Ball 14b is directly above contact point 6, ball 14c is spaced to the right by a distance $a$, and ball 14a is spaced to the left by a slightly less distance $a-$. Ball 14b transmits the highest portion of the total load; the remaining portion of the load is transmitted by balls 14a and 14c. Due to the fact that ball 14c is slightly closer to ball 14b than ball 14a, ball 14c transmits a slightly higher percentage of the load than ball 14a. The differential in load transmission causes the resultant force line to be displaced slightly to the right of the nominal load contact point 6 when the ball elements are in the FIG. 1 positions. The pressure of ball 14b on the surface of race 12 is slightly less than it would be if the resultant force line were directed through the nominal load contact point 6.

In the FIG. 2 condition ball 14b is slightly closer to ball 14c than ball 14d. The resultant force line is located slightly to the left of nominal load contact point 6. In the FIG. 3 condition ball 14a is somewhat closer to ball 14d than ball 14c so that the resultant force line is shifted back to the right of nominal load contact point 6.

The resultant force line shifts back and forth on the surface of race 12 rather than remaining at point 6 so that the peak load condition exists at any one point on the race surface for only a fraction of the total time that load force L is applied. Over an extended operational period the probability of fatigue or shock failure at any single point on the race surface is reduced.

It was assumed in the above discussion that the load was to be applied in a single direction as designated by letter L. In practice the load can be applied in different directions at different times in the rotational cycle. Also, the intensity of the load can vary at different times and different rotational speeds. The nature of the load under varying conditions is difficult to predict in advance. Therefore the entire surface of race 12 must be designed to potentially receive the peak load forces. By spacing the anti-friction elements unevenly, as shown in FIG. 1, any wear or loading pattern obtained during service will be varied due to the aforementioned shift in peak load line of action. On the basis of probability the expected service life of the bearing assembly will thereby be increased.

FIG. 1 shows the invention applied to a radial ball bearing. The invention is also believed applicable to other types of anti-friction bearings, such as thrust bearings. In either type bearing the anti-friction elements can be ball elements or roller elements. The spacer device can be a single metal strip as shown in FIG. 1, or a convoluted wire element, or a number of coil spring elements.

I wish it to be understood that I do not desire to be limited to the exact details of construction shown and described for obvious modifications will occur to a person skilled in the art.

I claim:

1. An anti-friction bearing comprising a load-applying annular race; a load-absorption annular race; a series of substantially identical anti-friction elements rollably engaging both races in orbiting fashion; and a separator concentric with the races, said separator engaging the anti-friction elements to maintain three different predetermined spacings therebetween; the total anti-friction element complement being an even multiple of the different element spacings, and each element spacing being repeated at regularly spaced intervals along the separator, whereby a given element spacing is in every case different than the preceding element spacing; a first one of the element spacings (a) being an even fraction of the total element spacing, a second one of the element spacings (a−) being slightly less than an even fraction of the total element spacing, and the third one of the element spacings (a+) being slightly greater than an even fraction of the total element spacing; the element spacing order being the same for each spacing group.

* * * * *